United States Patent
Aten

(10) Patent No.: US 9,873,504 B2
(45) Date of Patent: Jan. 23, 2018

(54) PROPULSION SYSTEM NACELLE WITH REDUCED NUMBER OF EXTERNAL SPLIT LINES

(71) Applicant: Rohr, Inc., Chula Vista, CA (US)

(72) Inventor: Michael Aten, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 767 days.

(21) Appl. No.: 14/057,828

(22) Filed: Oct. 18, 2013

(65) Prior Publication Data

US 2015/0110613 A1    Apr. 23, 2015

(51) Int. Cl.
  *B64C 7/02*    (2006.01)
  *B64D 29/08*    (2006.01)
  *F01D 25/24*    (2006.01)

(52) U.S. Cl.
  CPC ............. *B64C 7/02* (2013.01); *B64D 29/08* (2013.01); *F01D 25/24* (2013.01)

(58) Field of Classification Search
  CPC .. B64C 7/02; B64C 7/00; B64C 23/00; B64C 11/18; B64D 29/08; B64D 29/00; B64D 33/02; B64D 2033/0286
  USPC ................................ 244/53 R, 54, 53 B, 130
  See application file for complete search history.

(56) References Cited

U.S. PATENT DOCUMENTS

| | | | | |
|---|---|---|---|---|
| 2,178,998 A | * | 11/1939 | Scott | B64D 29/08 123/41.59 |
| 2,550,337 A | * | 4/1951 | Duffendack, Jr. | B64D 29/08 123/41.7 |
| 3,347,578 A | * | 10/1967 | Sheehan | B64D 29/06 244/54 |
| 5,806,302 A | | 9/1998 | Cariola et al. | |
| 5,826,823 A | | 10/1998 | Lymons et al. | |
| 5,864,922 A | | 2/1999 | Kraft | |
| 6,220,546 B1 | | 4/2001 | Klamka et al. | |
| 6,293,495 B1 | | 9/2001 | Aten et al. | |
| 6,334,588 B1 | * | 1/2002 | Porte | B64D 29/08 244/129.4 |
| 6,546,715 B1 | | 4/2003 | Blevins et al. | |
| 8,025,499 B2 | | 9/2011 | Hubert et al. | |
| 8,091,335 B2 | | 1/2012 | Sternberger | |
| 8,109,466 B2 | | 2/2012 | Aten et al. | |
| 8,394,315 B2 | | 3/2013 | Hubert et al. | |
| 2003/0102405 A1 | | 6/2003 | McEvoy | |
| 2010/0284806 A1 | * | 11/2010 | Vauchel | B64D 29/08 415/214.1 |

(Continued)

FOREIGN PATENT DOCUMENTS

FR    987970    8/1951

OTHER PUBLICATIONS

EP search report for EP14188776.0 dated Feb. 23, 2015.

*Primary Examiner* — Gregory Anderson
*Assistant Examiner* — Danielle M Christensen
(74) *Attorney, Agent, or Firm* — O'Shea Getz P.C.

(57) ABSTRACT

A cowl for use in a nacelle is provided. The nacelle at least partially surrounds an engine that extends circumferentially about an axially-extending engine centerline. The cowl includes a first side portion and a second side portion. The first and second side portions each are pivotably connected to the nacelle proximate a top of the nacelle. The first and second side portions are configured so that they abut one another to form an external split line proximate the top of the nacelle.

16 Claims, 5 Drawing Sheets

(56) References Cited

U.S. PATENT DOCUMENTS

2011/0250054 A1* 10/2011 Pereira .................. B64D 29/08
                                                      415/126
2013/0092755 A1    4/2013  Aten et al.
2013/0193224 A1    8/2013  Aten et al.
2014/0334922 A1   11/2014  Fabre et al.

* cited by examiner

PROPULSION SYSTEM NACELLE WITH REDUCED NUMBER OF EXTERNAL SPLIT LINES

BACKGROUND

1. Technical Field

Aspects of the present invention relate to a propulsion system, and more particularly relate to a propulsion system having a nacelle.

2. Background Information

It is known to provide a propulsion system that includes, for example, an engine (e.g., a gas turbine engine), a nacelle that at least partially surrounds the engine, and a pylon that connects the engine and the nacelle to a vehicle (e.g., an aircraft). The nacelle typically includes a plurality of components (e.g., an inlet, a fan cowl, a thrust reverser) that form one or more external split lines there between. The external split lines can be problematic in that they can create drag. Aspects of the present invention are directed to this and other problems.

SUMMARY OF ASPECTS OF THE INVENTION

According to an aspect of the present invention, a cowl for use in a nacelle is provided. The nacelle at least partially surrounds an engine that extends circumferentially about an axially-extending engine centerline. The cowl includes a first side portion and a second side portion. The first and second side portions each are pivotably connected to the nacelle proximate a top of the nacelle. The first and second side portions are configured so that they abut one another to form an external split line proximate the top of the nacelle.

According to an aspect of the present invention, a cowl for use in a nacelle is provided. The nacelle at least partially surrounds an engine that extends circumferentially about an axially-extending engine centerline. The cowl includes a first side portion and a second side portion. The first and second side portions collectively extend around substantially all of a circumferentially-extending outer surface of at least an axial portion of a fan section of the engine. The first and second side portions are pivotably connected to the nacelle proximate a top of the nacelle such that they abut one another to form an external split line proximate the top of the nacelle.

According to an alternative or additional aspect of the present invention, the cowl is an annular structure that extends circumferentially about an axially-extending cowl centerline; the cowl is circumferentially segmented into at least a first segment and a second segment; and the first side portion is the first segment and the second side portion is the second segment.

According to an alternative or additional aspect of the present invention, the first and second side portions each are selectively moveable between a closed position and an open position; and the first and second side portions are configured so that when they are both in their respective closed positions, they abut one another to form the external split line proximate the top of the nacelle.

According to an alternative or additional aspect of the present invention, the first and second side portions each include a top edge portion, a bottom edge portion, a forward edge portion, and an aft edge portion; the first and second side portions each extend axially between their respective forward and aft edge portions; and the first and second side portions each extend circumferentially between their respective top and bottom edge portions.

According to an alternative or additional aspect of the present invention, the respective top edge portions of the first and second side portions each are pivotably connected to the nacelle.

According to an alternative or additional aspect of the present invention, the first and second side portions are configured so that when they are both in their respective closed positions, their respective top edge portions abut one another to form the external split line proximate the top of the nacelle.

According to an alternative or additional aspect of the present invention, the external split line proximate the top of the nacelle extends in an axial direction that is at least substantially parallel to the engine centerline.

According to an alternative or additional aspect of the present invention, the first and second side portions are configured so that when they are both in their respective closed positions, their respective bottom edge portions abut one another to form an external split line proximate a bottom of the nacelle.

According to an alternative or additional aspect of the present invention, the first and second side portions are pivotably connected to the nacelle in a manner that permits the first and second side portions to be moved between their respective closed and opened positions without interfering with one another.

According to an alternative or additional aspect of the present invention, the first side portion of the cowl is pivotably connected to the nacelle such that it pivots about an axially-extending pivot axis, and the second side portion of the cowl is pivotably connected to the nacelle such that it pivots about the pivot axis.

According to an alternative or additional aspect of the present invention, the cowl is a fan cowl, and the nacelle at least partially surrounds a fan section of a turbofan type gas turbine engine.

According to an alternative or additional aspect of the present invention, the nacelle further includes an inlet that extends annularly about the engine centerline, and the first and second side portions of the cowl are configured so that when they are both in their respective closed positions, forward edge portions of each of the first and second side portions abut an aft edge of the unitary structure that forms the radially outer surface of the inlet.

According to an alternative or additional aspect of the present invention, a pylon connects the nacelle and the engine to a vehicle, and the first and second side portions of the cowl are configured so that when they are both in their respective closed positions, they collectively define a protrusion that permits the cowl to cover a forward portion of the pylon.

According to an alternative or additional aspect of the present invention, the nacelle further includes a thrust reverser that extends annularly about the engine centerline, and the first and second side portions of the cowl are configured so that when they are both in their respective closed positions, aft edge portions of each of the first and second side portions abut a forward edge of the thrust reverser.

These and other aspects of the present invention will become apparent in light of the drawings and detailed description provided below.

DETAILED DESCRIPTION OF ASPECTS OF THE INVENTION

The present disclosure describes embodiments of a cowl 10 (see FIGS. 1-3), and embodiments of a nacelle 12 (see FIGS. 1-3) that includes the cowl 10. The present disclosure describes aspects of the present invention with reference to the embodiment illustrated in FIGS. 1-3; however, aspects of the present invention are not limited to the embodiments illustrated in FIGS. 1-3. The present disclosure may describe one or more features as having a length extending relative to a x-axis, a width extending relative to a y-axis, and/or a height extending relative to a z-axis. The drawings illustrate the respective axes.

The present disclosure uses the terms "circumferential", "annular", "abut", and variations thereof, to describe one or more features. The term "circumferential", and variations thereof, are used herein to indicate that a feature extends along an arc that is centered about an axis of rotation. The term "annular", and variations thereof, are used herein to indicate that a feature is at least partially in the form of a ring (e.g., a ring in a circular shape or another shape). The term "abut", and variations thereof, are used herein to indicate either that a feature is in direct contact with another feature, or that a feature is in such close proximity to another feature that it is almost in direct contact with that feature.

Figure 1:
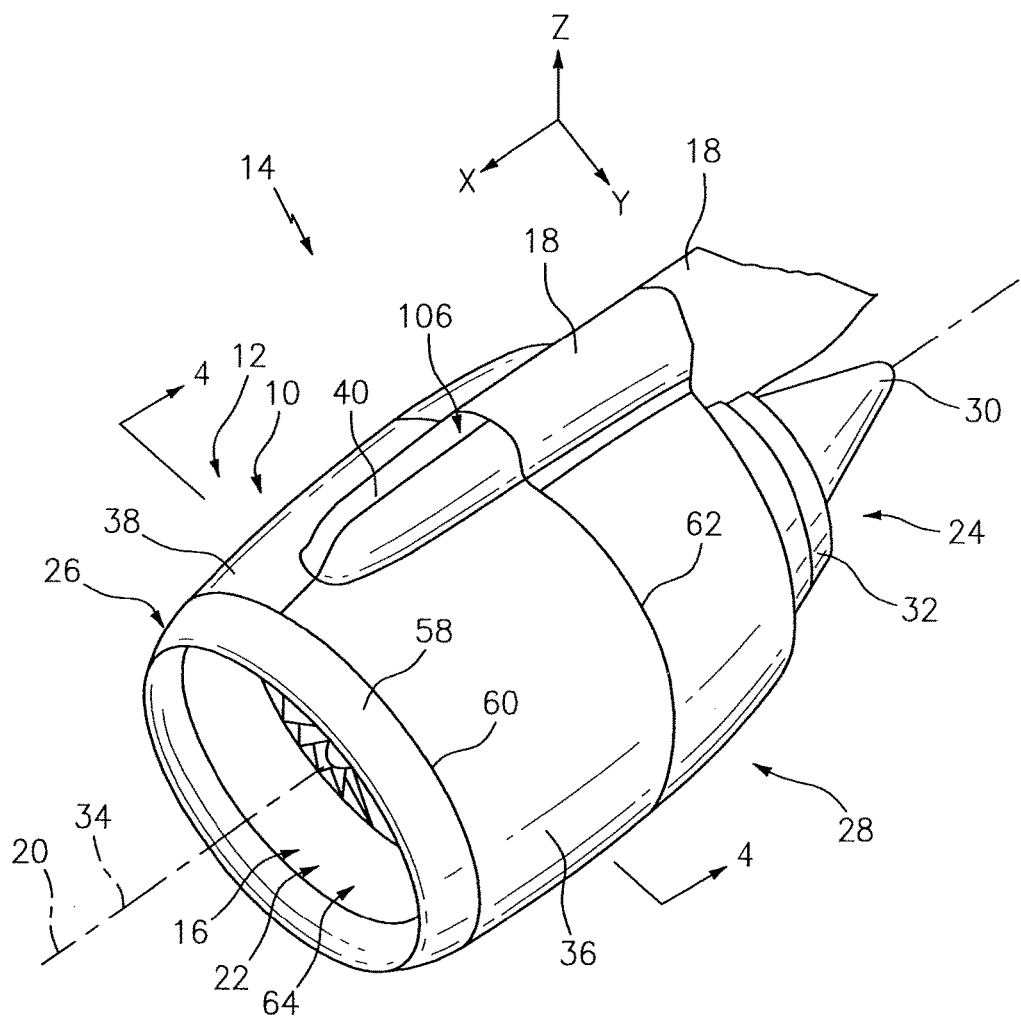
FIG. 1 is a perspective view of a propulsion system.
Figure 2:
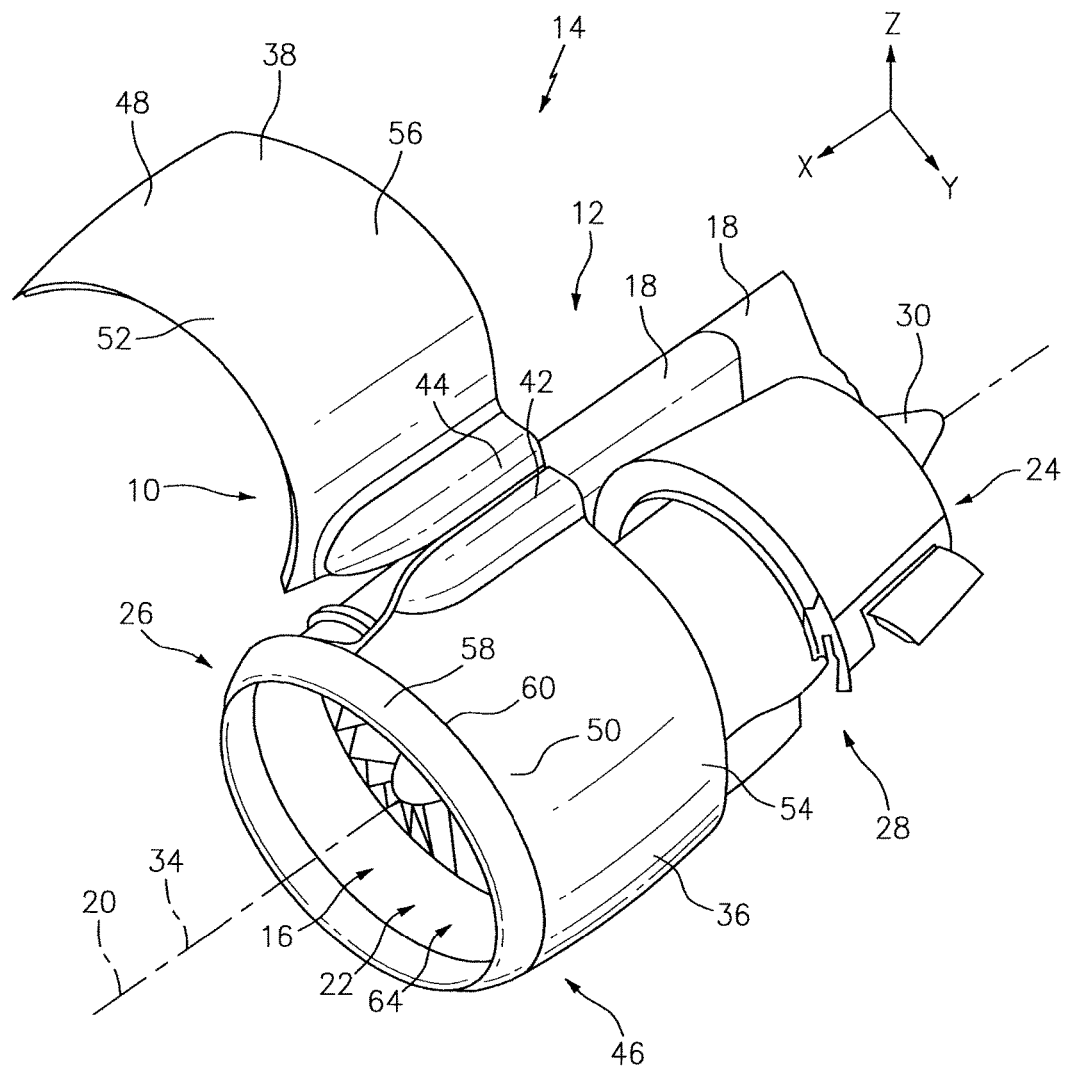
FIG. 2 is a perspective view of the propulsion system of FIG. 1.
Figure 3:
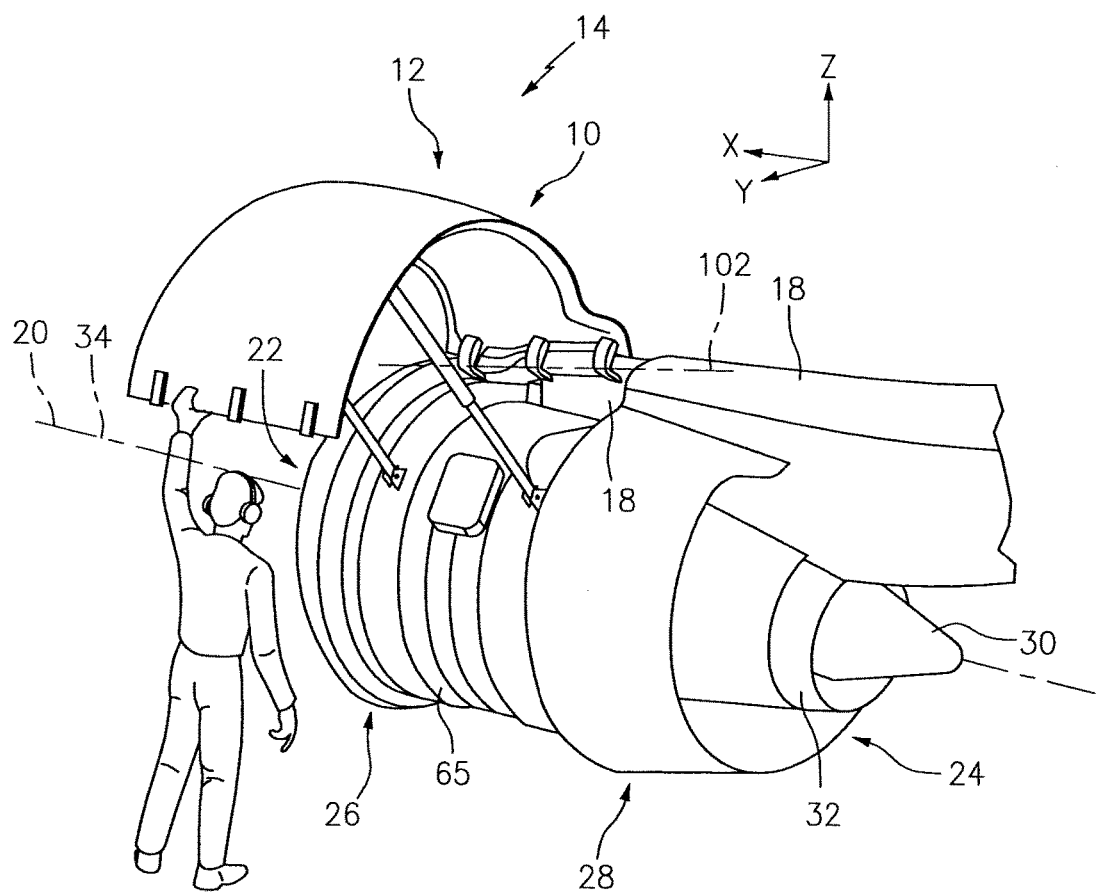
FIG. 3 is a perspective view of the propulsion system of FIG. 1.

Referring to FIGS. 1-3, the cowl 10 is included in a nacelle 12, and the nacelle 12 is included in a propulsion system 14. The propulsion system 14 and the nacelle 12 can be configured in various different ways. In the embodiment illustrated in FIGS. 1-3, the propulsion system 14 additionally includes an engine 16 (see FIGS. 1 and 2) and a pylon 18; the engine 16 is a gas turbine engine that extends in a lengthwise direction along an axially-extending engine centerline 20, between a forward end 22 and an aft end 24; the nacelle 12 partially surrounds the engine 16; the pylon 18 connects the nacelle 12 and the engine 16 to the underside of an aircraft wing (not shown); and the nacelle 12 additionally includes an inlet 26, a thrust reverser 28, an exhaust centerbody 30, and an exhaust nozzle 32 (see FIGS. 1 and 3).

The cowl 10 is an annular structure that extends circumferentially about an axially-extending cowl centerline 34. In some embodiments, including the embodiment illustrated in FIGS. 1-3, the cowl 10 is positioned relative to the engine 16 of the propulsion system 14 such that the cowl centerline 34 is aligned with the engine centerline 20. The cowl 10 is circumferentially segmented into at least a first side portion 36 and a second side portion 38 (see FIGS. 1 and 2). The first and second side portions 36, 38 of the cowl 10 each are pivotably connected to the nacelle 12 proximate the top of the nacelle 12. The first and second side portions 36, 38 each are selectively moveable between a closed position and an open position. FIG. 1 illustrates the first and second side portions 36, 38 in their respective closed positions. FIG. 2 illustrates the first side portion 36 in its open position, and illustrates the second side portion 38 in its closed position. FIG. 3 illustrates the second side portion 38 in its open position. When the first and second side portions 36, 38 are both in their respective closed positions, they abut one another to form an external split line 40 (see FIG. 1) proximate the top of the nacelle 12.

The first and second side portions 36, 38 of the cowl 10 can be configured in various different ways. In the embodiment illustrated in FIG. 1-3, the first and second side portions 36, 38 each include a top edge portion 42, 44 (see FIG. 2), a bottom edge portion 46, 48 (see FIG. 2), a forward edge portion 50, 52 (see FIG. 2), and an aft edge portion 54, 56 (see FIG. 2); the first and second side portions 36, 38 each extend axially between their respective forward and aft edges portions 50, 52, 54, 56; and the first and second side portions 36, 38 each extend circumferentially between their respective top and bottom edge portions 42, 44, 46, 48. In this embodiment, the respective top edge portions 42, 44 of the first and second side portions 36, 38 each are pivotably connected to the nacelle 12, as will be described in more detail below. In this embodiment, when the first and second side portions 36, 38 are both in their respective closed positions, their respective top edge portions 42, 44 abut one another to form the external split line 40 proximate the top of the nacelle 12. In this embodiment, the external split line 40 extends in an axial direction that is at least substantially parallel to the engine centerline 20 and the cowl centerline 34; and the external split line 40 extends between the respective forward edge portions 50, 52 and the respective aft edge portions 54, 56 of the first and second side portions 36, 38. In some embodiments, including the embodiment illustrated in FIGS. 1-3, when the first and second side portions 36, 38 are both in their respective closed positions, their respective bottom edge portions 46, 48 can be connected to one another, and/or can be connected to another portion of the nacelle 12, to hold the first and second side portions 36, 38 in their respective closed positions during operation of the propulsion system 14. In some embodiments, including the embodiment illustrated in FIGS. 1-3, when the first and second side portions 36, 38 are both in their respective closed positions, they abut one another to form an axially-extending external split line (not shown) proximate the bottom of the nacelle 12. In the embodiment illustrated in FIG. 1-3, the inlet 26 is an annular structure that extends circumferentially about the engine centerline 20; when the first and second side portions 36, 38 of the cowl 10 are both in their respective closed positions, their respective forward edge portions 50, 52 each abut an aft edge of the structure that forms the radially outer surface 58 of the inlet 26, to form a circumferentially-extending external split line 60 (see FIGS. 1 and 2). In the embodiment illustrated in FIG. 1-3, the thrust reverser 28 is an annular structure that extends circumferentially about the engine centerline 20; and when the first and second side portions 36, 38 are both in their respective closed positions, their respective aft edge portions 54, 56 each abut a forward edge of the thrust reverser 28 to form a circumferentially-extending external split line 62 (see FIG. 1). Aspects of the present invention are not limited to use with a nacelle 12 having the inlet 26 and/or the thrust reverser 28 shown in FIGS. 1-3.

Figure 4:
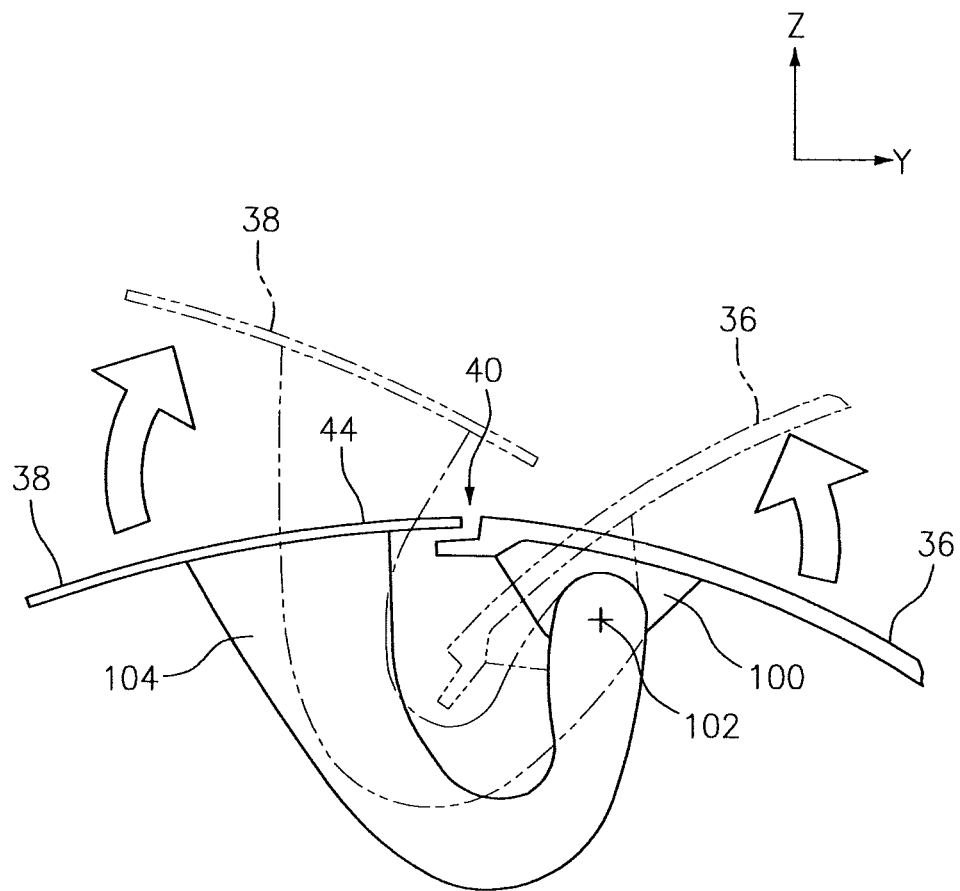
FIG. 4 is a partial sectional elevation view of the propulsion system of FIG. 1.

The first and second side portions 36, 38 of the cowl 10 can be pivotably connected to the nacelle 12 in various different ways. In some embodiments, the first and second side portions 36, 38 of the cowl 10 can be pivotably connected to the nacelle 12 using one of various types of hinged connections. In some embodiments, including the embodiment illustrated in FIGS. 1-3, the first and second side portions 36, 38 are pivotably connected to the nacelle 12 in a manner that permits each of the first and second side portions 36, 38 to be moved between their respective closed and opened positions without interfering with one another. In some embodiments, including the embodiment illustrated in FIG. 4, the top edge portion 42 of the first side portion 36 is pivotably connected to the nacelle 12 using a hinge 100 that permits the first side portion 36 to move between its closed position (shown in solid line in FIG. 4) and its open position (shown in broken line in FIG. 4) about a lengthwise-extending hinge axis 102 (see FIGS. 3 and 4); and the top edge portion 44 of the second side portion 38 is pivotably connected to the nacelle 12 using a gooseneck-type hinge 104 that permits the second side portion 38 to move between its closed position (shown in solid line in FIG. 4) and its open position (shown in broken line in FIG. 4) about the same hinge axis 102 (see FIGS. 3 and 4) without interfering with the first side portion 36 of the cowl 10.

The first and second side portions 36, 38 of the cowl 10 can be configured to cover (e.g., can be configured to extend around) various different components of the propulsion system 14 when they (the first and second side portions 36, 38) are in their respective closed positions. In some embodiments, including the embodiment illustrated in FIGS. 1-3, the first and second side portions 36, 38 can be configured to cover at least a portion of a fan section 64 of the engine 16 (e.g., including the fan case 65 (see FIG. 3)), when they are in their respective closed positions. In some embodiments, including the embodiment illustrated in FIGS. 1-3, the first and second side portions 36, 38 of the cowl 10 can be configured to cover at least a portion of the inlet 26 portion of the nacelle 12 when they are in their respective closed positions. In some embodiments, including the embodiment illustrated in FIGS. 1-3, the first and second side portions 36, 38 can be configured to cover at least at least a portion of the pylon 18 when they are in their respective closed positions. In some embodiments, the first and second side portions 36, 38 of the cowl 10 collectively define a generally circular or generally elliptical sectional shape in all planes that extend perpendicular to the cowl centerline 34 (e.g., a y-z plane in FIG. 1). In other embodiments, the first and second side portions 36, 38 of the cowl 10 can be shaped such that the cowl 10 defines a radially-extending and/or axially-extending protrusion. In embodiment illustrated in FIG. 1, for example, the first and second side portions 36, 38 of the cowl 10 are shaped such that the cowl 10 defines a radially-extending and axially-extending protrusion 106 that permits the cowl 10 to cover a forward portion of the pylon 18 when the first and second side portions 36, 38 of the cowl 10 are in their respective closed positions.

Figure 5:
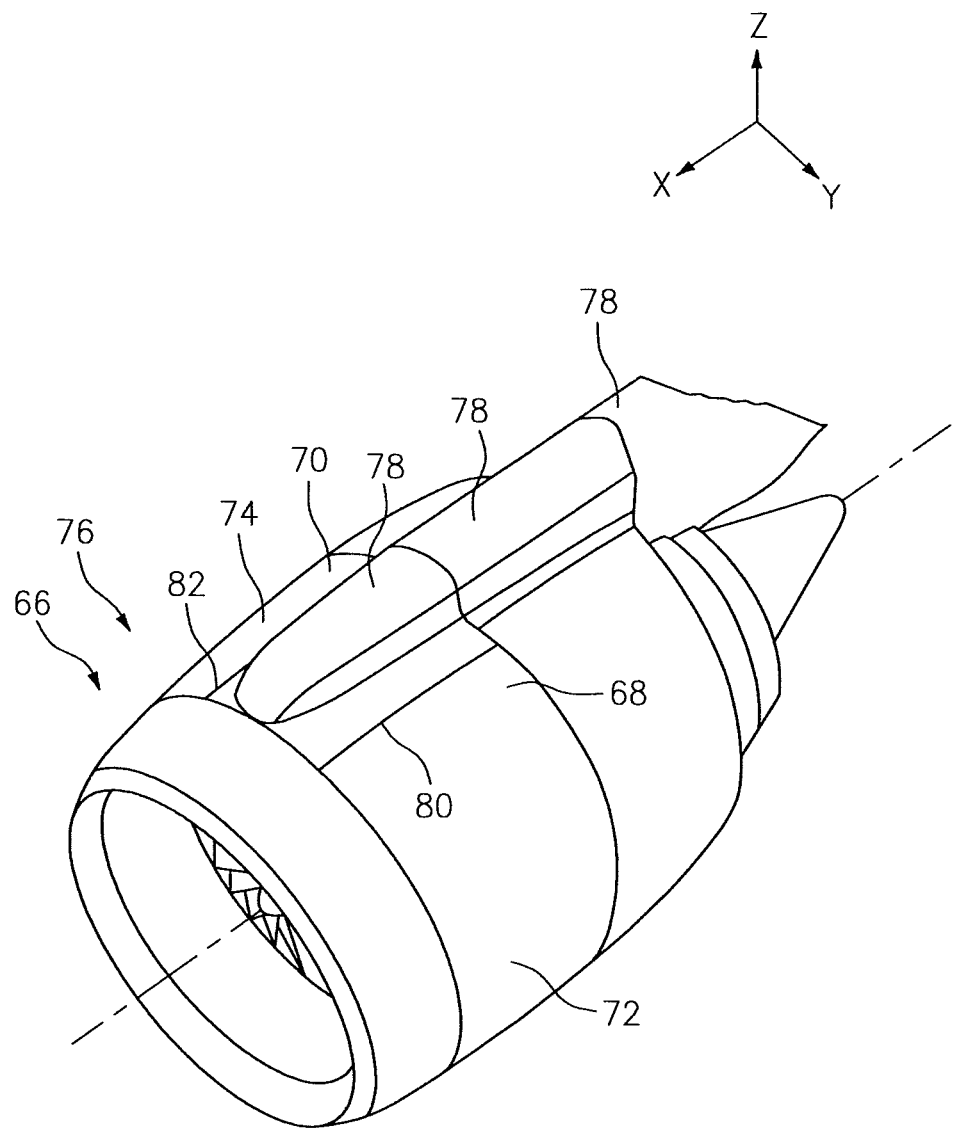
FIG. 5 is a perspective view of a prior art propulsion system.

The nacelle 12 described herein can be advantageous in that it can have fewer external split lines than some prior art nacelles, and thus can have less drag than some prior art nacelles. Importantly, the nacelle 12 described herein can weigh the same as or less than comparable prior art nacelles. FIG. 5 illustrates an example of a prior art nacelle 66 in which the top edge portions 68, 70 of the first and second side portions 72, 74 of the cowl 76 each abut the pylon 78. In this prior art nacelle 66, separate axially-extending external split lines 80, 82 are formed between the pylon 78 and each of the top edge portions 68, 70 of the first and second side portions 72, 74 of the cowl 76. Thus, whereas the top of the present nacelle 12 of FIGS. 1-3 includes only one (1) axially-extending external split line 40 (see FIG. 1), the top of this prior art nacelle 66 includes two (2) separate axially-extending external split lines 80, 82.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A cowl for use in a nacelle, the nacelle at least partially surrounding an engine that extends circumferentially about an axially-extending engine centerline, the cowl comprising:
   a first side portion and a second side portion, the first and second side portions collectively extending around substantially all of a circumferentially-extending outer surface of at least an axial portion of a fan section of the engine, the first and second side portions being pivotably connected to the nacelle proximate a top of the nacelle such that they abut one another to form an external split line proximate the top of the nacelle;
   wherein the first side portion is configured to pivot about a pivot axis, the pivot axis is disposed a first radial distance from the axially-extending engine centerline, the external split line is disposed a second radial distance from the axially-extending engine centerline, and the first radial distance is less than the second radial distance;
   wherein a pylon connects the nacelle and the engine to a vehicle; and
   wherein the first and second side portions of the cowl are configured so that when they are both in their respective closed positions, they collectively define a protrusion that permits the cowl to cover a forward portion of the pylon.

2. The cowl of claim 1, wherein the nacelle further includes an inlet that extends annularly about the axially-extending engine centerline;
   wherein the first and second side portions of the cowl are configured so that when they are both in their respective closed positions, forward edge portions of each of the first and second side portions abut an aft edge of a unitary structure that forms the radially outer surface of the inlet.

3. The cowl of claim 1, wherein the nacelle further includes a thrust reverser that extends annularly about the axially-extending engine centerline;
   wherein the first and second side portions of the cowl are configured so that when they are both in their respective closed positions, aft edge portions of each of the first and second side portions abut a forward edge of the thrust reverser.

4. The cowl of claim 1, wherein the second side portion is configured to pivot about the pivot axis, and the pivot axis is laterally offset from the axially-extending engine centerline such that the pivot axis is laterally overlapped by the first side portion but not by the second side portion.

5. A cowl for use in a nacelle, the nacelle at least partially surrounding an engine that extends circumferentially about an axially-extending engine centerline, the cowl comprising:
   a first side portion and a second side portion, the first and second side portions each being pivotably connected to the nacelle proximate a top of the nacelle, and the first and second side portions being configured so that they abut one another to form an external split line proximate the top of the nacelle;
   wherein the first side portion is configured to pivot about an axially-extending pivot axis that is circumferentially offset from the external split line, and the second side portion is configured to pivot about the axially-extending pivot axis.

6. The cowl of claim 5, wherein axially-extending pivot axis is disposed a first radial distance from the axially-extending engine centerline, the external split line is disposed a second radial distance from the axially-extending engine centerline, and the first radial distance is less than the second radial distance.

7. The cowl of claim 5, wherein the hinge comprises a gooseneck-type hinge.

8. The cowl of claim 5, wherein the cowl is an annular structure that extends circumferentially about an axially-extending cowl centerline;
wherein the cowl is circumferentially segmented into at least a first segment and a second segment;
wherein the first side portion is the first segment and the second side portion is the second segment.

9. The cowl of claim 5, wherein the first and second side portions each are selectively moveable between a closed position and an open position; and
wherein the first and second side portions are configured so that when they are both in their respective closed positions, they abut one another to form the external split line proximate the top of the nacelle.

10. The cowl of claim 5, wherein the first and second side portions each include a top edge portion, a bottom edge portion, a forward edge portion, and an aft edge portion;
wherein the first and second side portions each extend axially between their respective forward and aft edge portions; and
wherein the first and second side portions each extend circumferentially between their respective top and bottom edge portions.

11. The cowl of claim 10, wherein the respective top edge portions of the first and second side portions each are pivotably connected to the nacelle.

12. The cowl of claim 10, wherein the first and second side portions are configured so that when they are both in their respective closed positions, their respective top edge portions abut one another to form the external split line proximate the top of the nacelle.

13. The cowl of claim 10, wherein the first and second side portions are configured so that when they are both in their respective closed positions, their respective bottom edge portions abut one another to form an external split line proximate a bottom of the nacelle.

14. The cowl of claim 5, wherein the external split line proximate the top of the nacelle extends in an axial direction that is at least substantially parallel to the axially-extending engine centerline.

15. The cowl of claim 5, wherein the first and second side portions are pivotably connected to the nacelle in a manner that permits the first and second side portions to be moved between their respective closed and opened positions without interfering with one another.

16. The cowl of claim 5, wherein the cowl is a fan cowl, and the nacelle at least partially surrounds a fan section of a turbofan type gas turbine engine.

\* \* \* \* \*